United States Patent [19]
Torin

[11] Patent Number: 5,519,757
[45] Date of Patent: May 21, 1996

[54] WIRELESS TELEPHONE SET

[75] Inventor: Shigetsune Torin, Hyogo, Japan

[73] Assignee: Mitsubishi Denki Kabushiki Kaisha, Tokyo, Japan

[21] Appl. No.: 214,219

[22] Filed: Mar. 17, 1994

[30] Foreign Application Priority Data

Apr. 19, 1993 [JP] Japan ................................. 5-114196

[51] Int. Cl.⁶ ............................ H04M 11/00; H04B 7/00
[52] U.S. Cl. ......................... 379/58; 379/63; 455/38.3; 455/343
[58] Field of Search ................................. 455/38.5, 343, 455/69, 70, 89, 127, 38.3; 379/58, 63, 59, 61; 395/370, 750

[56] References Cited

U.S. PATENT DOCUMENTS

| | | | |
|---|---|---|---|
| 4,509,201 | 4/1985 | Sekigawa et al. | 379/61 |
| 5,058,203 | 10/1991 | Imagami | 455/343 |
| 5,083,266 | 1/1992 | Watanabe | 395/750 |
| 5,142,563 | 8/1992 | Nyuu et al. | 379/58 |
| 5,224,152 | 6/1993 | Harte | 379/59 |
| 5,335,263 | 8/1994 | Tsunehiro et al. | |
| 5,369,789 | 11/1994 | Lee | 379/58 |

FOREIGN PATENT DOCUMENTS

| | | | |
|---|---|---|---|
| 0473465 | 3/1992 | European Pat. Off. | |
| 55-130244 | 10/1980 | Japan | 455/127 |
| 4149613 | 5/1992 | Japan | |

Primary Examiner—Scott A. Rogers
Assistant Examiner—Fan Lee
Attorney, Agent, or Firm—Rothwell, Figg, Ernst & Kurz

[57] ABSTRACT

A wireless telephone set comprise control circuit for controlling the transmission and the reception of signals, and a power switch for controlling the supply of a power to the control circuit. The power switch is turned ON to supply the power to the control circuit in response to each of frame signals, and is turned OFF when the wireless telephone set is in a waiting state for waiting an arriving call directed to the wireless telephone set, thereby the power consumption in the control circuit is reduced.

11 Claims, 14 Drawing Sheets

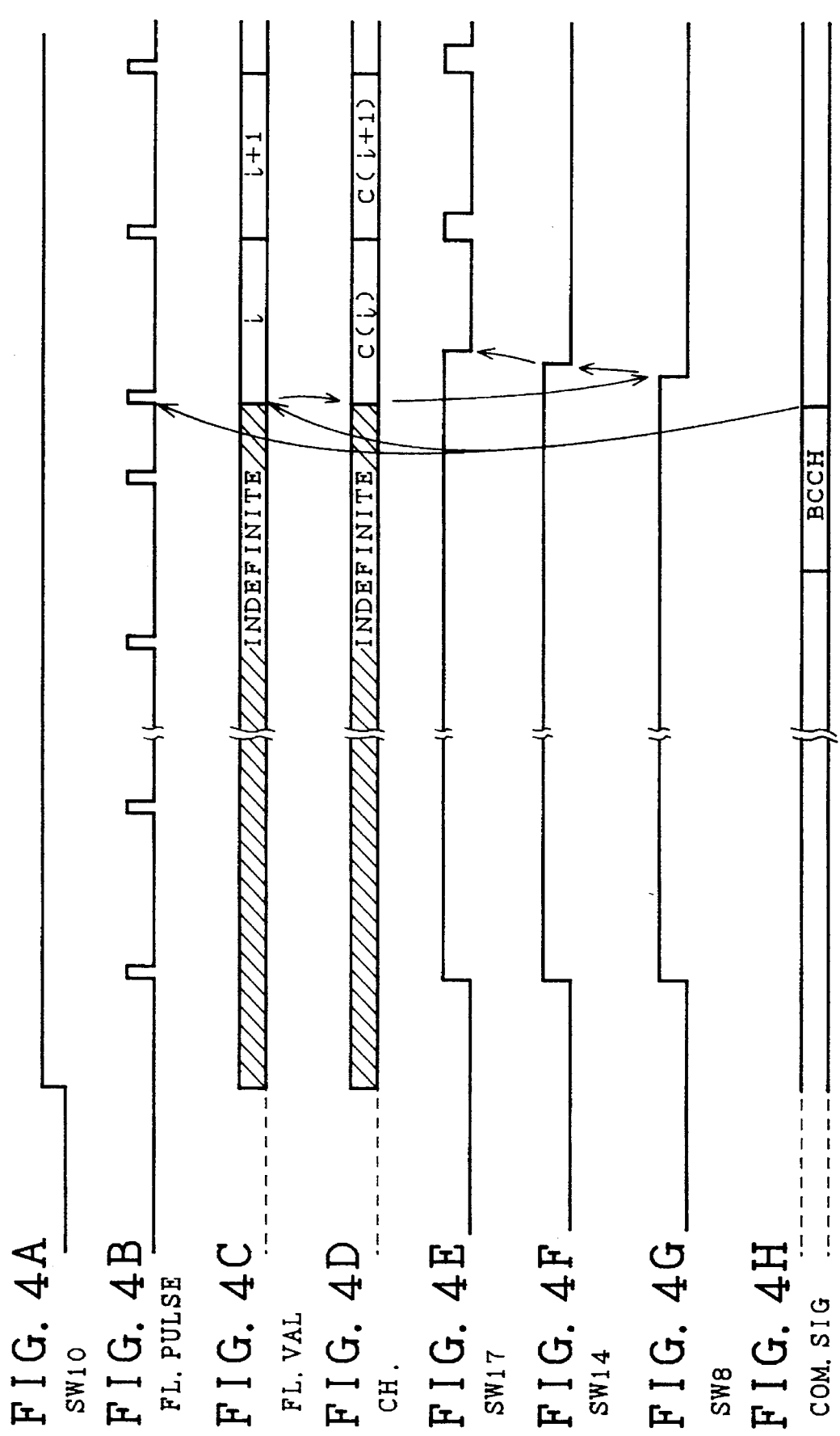

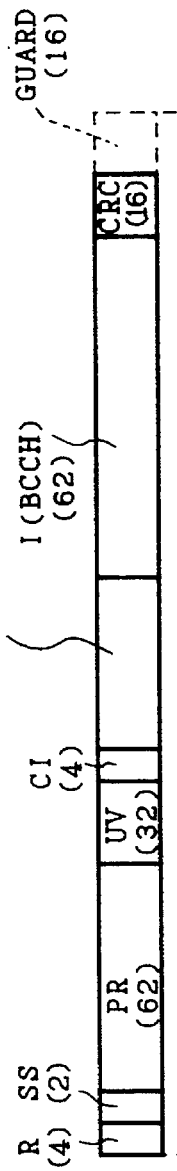
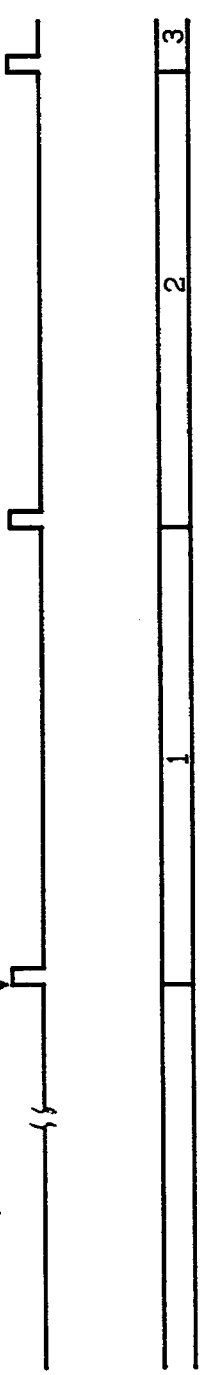
FIG. 5A
FIG. 5B FL. PULSE
FIG. 5C FL. VAL

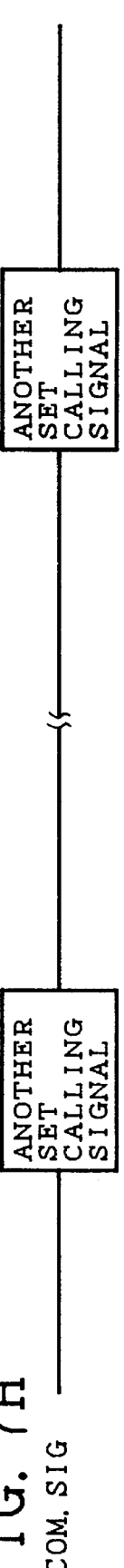
FIG. 7A FL. PULSE
FIG. 7B FL. VAL
FIG. 7C CH.
FIG. 7D SW17 ON OFF
FIG. 7E SW14 ON OFF
FIG. 7F SW8 ON OFF
FIG. 7G SW7 OFF
FIG. 7H COM. SIG

FIG. 8A FL. PULSE

FIG. 8B FL. VAL

FIG. 8C CH. PCH

FIG. 8D SW17 ON/OFF

FIG. 8E SW14 ON/OFF

FIG. 8F SW8 ON/OFF

FIG. 8G SW7 ON/OFF

FIG. 8H COM. SIG OWN SET CALLING SIGNAL | CONTROL | COMMUNICATION | CONTROL

FIG. 8I WAITING STATE | COMMUNICATION STARTING PROCESS | ENDING PROCESS | WAITING STATE

FL. PULSE

FL. VAL

CH.

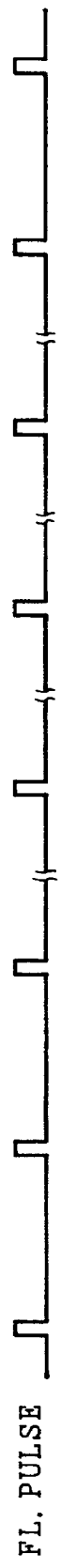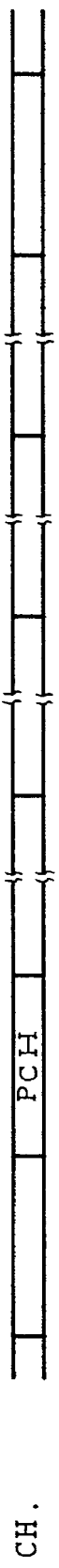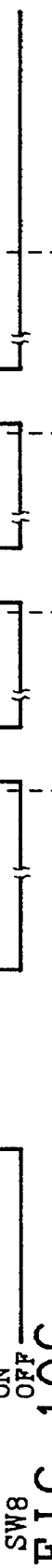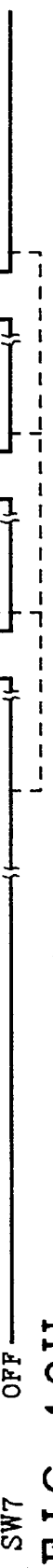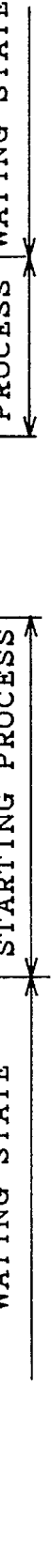

WIRELESS TELEPHONE SET

BACKGROUND OF THE INVENTION

1. Field of the Invention

The present invention relates to a wireless telephone set such as a digital wireless telephone equipment and so forth, which is operable in a power saving mode.

2. Description of the Related Art

FIG. 1 is a block diagram showing a conventional wireless telephone set. In the figure, reference numeral 1 is an antenna for transmitting and receiving electromagnetic wave, and 2 is a duplexer for distributing transmitting high frequency signals to the antenna 1 and for coupling receiving high frequency signals from the antenna 1. Reference numeral 3 is a transmitter for converting a voice electric signal into the afore-mentioned transmitting high frequency signal, and 4 is a microphone for converting a voice into the above-mentioned voice electric signal. Reference numeral 5 is a receiver for converting the above-mentioned high frequency signal into a voice electric signal, and 6 is a speaker for converting the voice electric signal into a voice. Reference numeral 7 is a transmitter-side power switch for turning ON or OFF of the power supplied to the above-mentioned transmitter 3, and 8 is a receiver-side power switch for turning ON or OFF of the power supplied to the above-mentioned receiver 5. Reference numeral 9 is a battery for supplying a power to the whole of this wireless telephone set, and 10 is a main switch for turning ON or OFF of the supply of the power from the battery 9. The above-mentioned transmitting-side power switch 7 and the receiving-side power switch 8 are connected through this main switch 10 to the battery 9.

Further, reference numeral 11 is a reference signal oscillator which directly receives the power supplied from the battery 9 through the main switch 10 to oscillate to generate a reference signal, and 12 is a frequency dividing circuit for dividing the reference signal generated by the reference oscillator 11 to output frame pulses. Reference numeral 13 is a timing generating circuit for controlling the timing of the transmission and the reception by controlling the abovementioned transmitter 3, the receiver 4, the transmitting-side power switch 7, the receiving-side power switch 8, and so forth, and 14 is a timing circuit power switch, connected to the battery 9 through the main switch 10, for turning ON or OFF of the power supplied to the timing generating circuit 13. Reference numeral 15 is a microprocessor as a control circuit for controlling the frequency dividing circuit 12, the timing generating circuit 13, the timing circuit power switch 14 and so forth, based on the frame pulses outputted from the above-mentioned frequency dividing circuit 12. In this connection, the power supply to the microprocessor 15 is directly effected from the main switch 10.

Next, the operation of the conventional circuit shown in FIG. 1 will be described. When the main switch 10 is turned ON, the microprocessor 15 is supplied with a power to start its operation so as to initialize the frequency dividing circuit 12. After that, during a waiting state for waiting an arriving call to the wireless telephone set under consideration (hereinafter simply referred to as a waiting state), the microprocessor 15 instructs the timing generating circuit 13 to turn OFF the transmitting-side power switch 7 and the receiving-side power switch 8, The microprocessor 15 also turns OFF the timing circuit power switch 14. By this, those which are supplied with the power are three, i.e., the reference oscillator 11, the frequency dividing circuit 12, and the microprocessor 15. The microprocessor 15 determines the type of the frame by counting the frame pulses from the frequency dividing circuit 12 by the software in the microprocessor 15, and when the frame is a control channel for the wireless telephone set under consideration, the timing circuit power switch 14 is turned ON to operate the timing generating circuit 13, so as to instruct the timing generating circuit 13 to turn ON the transmitting-side power switch 7 and the receiving-side power switch 8. Thus, the microprocessor 15 controls the timing generating circuit 13 in accordance with the frame type of each frame.

Since the conventional wireless telephone set is constructed as above, even when it is under a waiting state, it is necessary to always supervise the frames by software in order to receive the control channel at the particular frame timing. Therefore, there is a problem in that a power must be always supplied to the microprocessor 15 even during a waiting state.

In addition, since there is no auxiliary battery in the conventional wireless telephone set, when the battery voltage is lowered due to exhaustion during a call is connected, there is a problem in that the call is disconnected.

SUMMARY OF THE INVENTION

In view of the foregoing, it is an object of the present invention to provide a wireless telephone set in which the power for the control circuit can be turned OFF during a waiting state.

It is another object of the present invention to provide a wireless telephone set in which a call is not disconnected even when the battery voltage is lowered.

According to the first aspect of the present invention, for achieving the above object, there is provided a wireless telephone set comprising control means for controlling the transmission and the reception of the signal, and a power switch for controlling the supply of a power to the control means. The power switch is turned ON to supply the power to the control means in response to each of frame signals, and is turned OFF when the control means judges that the wireless telephone set is in a waiting state for waiting a frame signal allocated to the wireless telephone set.

As stated above, in the wireless telephone set according to the first aspect of the present invention, since the control means turns OFF the power switch after the control means judges that the wireless telephone set is in a waiting state for waiting a frame signal allocated to the wireless telephone set, the power supply to the control means in the waiting state is greatly reduced, and as a result, the period for the waiting state can be elongated.

According to the second aspect of the present invention, there is provided a wireless telephone set further comprising a battery backup circuit switching from a battery to an auxiliary battery when the voltage of the battery is lowered, an auxiliary storage supplied with the power through the battery backup circuit for storing and holding the operating state of the wireless telephone set.

As stated above, in the wireless telephone set according to the second aspect of the present invention, since the auxiliary storage receives the supply of the power from the battery back up circuit to store and hold the operating state of the wireless telephone set under consideration, even when the battery is exchanged during communication, the communication can be started again without disconnecting the call, once a new battery is mounted.

According to the third aspect of the present invention, there is provided a wireless telephone set in which a timing control of the transmission and reception by a timing generating circuit is effected based on a frame pulse outputted from a frequency dividing circuit and a frame value read from a frame counter.

As stated above, in the wireless telephone set according to the third aspect of the present invention, since the timing generating circuit carries out the timing control based on the frame pulse from the frequency dividing circuit and the frame value from the frame counter, the processing load of the control means is reduced.

The above and further objects and novel features of the invention will more fully appear from the following detailed description when the same is read in connection with the accompanying drawings, It is to be expressly understood, however, that the drawings are for purpose of illustration only and are not intended as a definition of the limits of the invention.

BRIEF DESCRIPTION OF THE DRAWINGS

FIG. 4A to FIG. 4H are time charts explaining the initialization of a frame pulse and a frame channel in the wireless telephone set shown in FIG. 2;

FIG. 5A to FIG. 5C are diagrams showing an example of the physical slot of a broadcast control channel and the relation between the broadcast control channel and the frame pulse and the frame value in the wireless telephone set shown in FIG. 2;

FIG. 7A to FIG. 7H are time charts explaining the operation when a calling signal directed to another telephone set is received during a waiting state in the wireless telephone set shown in FIG. 2;

FIG. 8A to FIG. 8I are time charts explaining the operation when a calling signal directed to the own wireless telephone set is received during a waiting state in the wireless telephone set shown in FIG. 2;

FIG. 10A to FIG. 10I are time charts explaining a modification of the operation when a calling signal directed to the own wireless telephone set is received during a waiting state in the wireless telephone set shown in FIG. 2;

DESCRIPTION OF THE PREFERRED EMBODIMENTS

Figure 1:
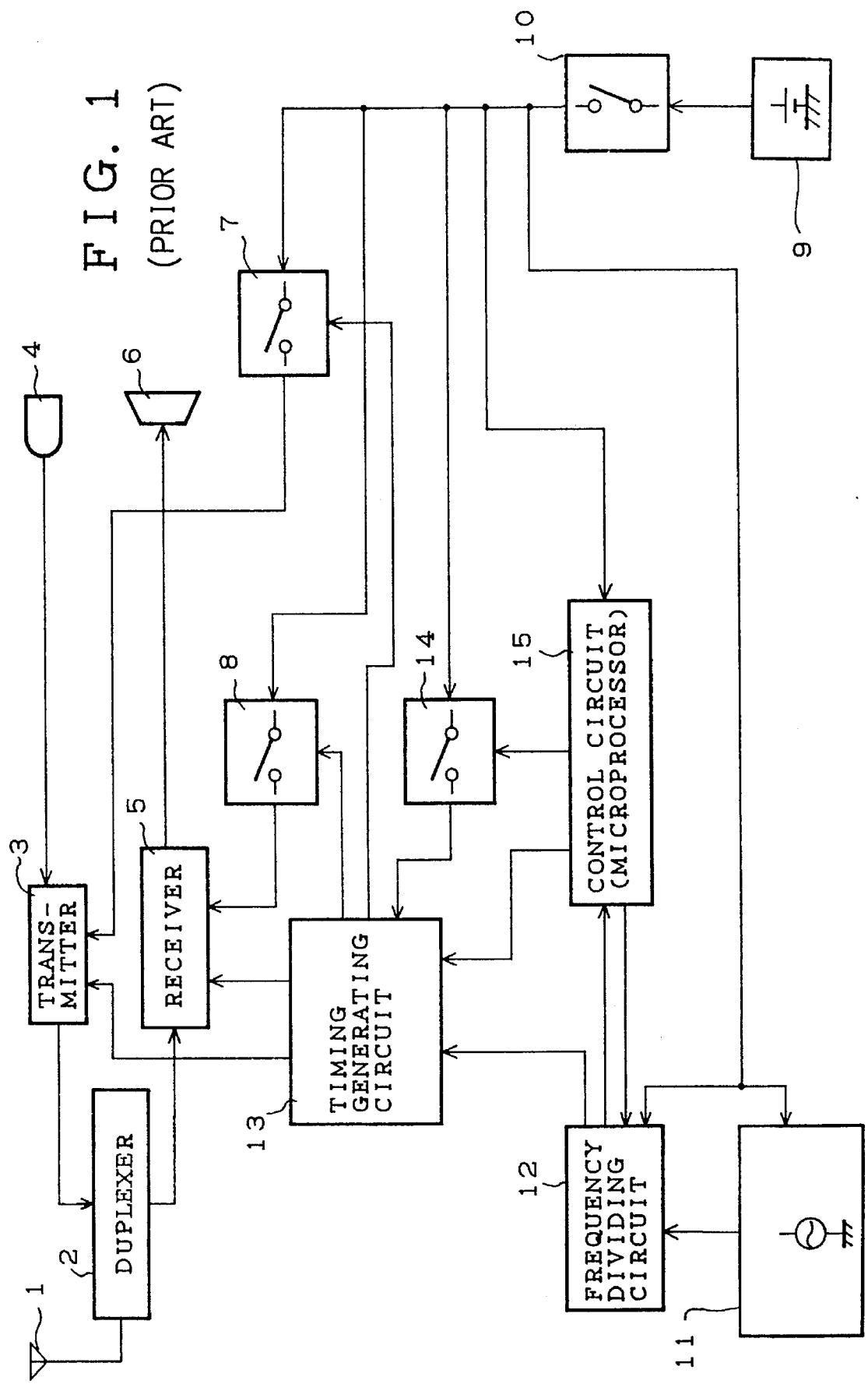
FIG. 1 is a block diagram showing a conventional wireless telephone set.

Embodiment 1.

In the following, an embodiment 1 of the present invention will be described with reference to the drawings. FIG. 2 is a block diagram showing an embodiment 1 of the present invention. In the figure, reference numeral 1 is an antenna, 2 is a duplexer, 3 is a transmitter, 4 is a microphone, 5 is a receiver, 6 is a speaker, 7 is a transmitting-side power switch, 8 is a receiving-side power switch, 9 is a battery, 10 is a main switch, 11 is a reference signal oscillator, 12 is a frequency dividing circuit, 13a is a timing generating circuit, 14 is a timing circuit power switch, and 15a is a microprocessor as a control circuit, which are the same or similar parts as the conventional parts in FIG. 1, and therefore, the detailed explanation is omitted here.

Reference numeral 16 is a frame counter for counting frame pulses outputted from the frequency dividing circuit 12 to output frame values. Reference numeral 17 is a control circuit power switch for controlling the supply of the power from the battery 9 through the main switch 10 to the microprocessor 15a under consideration. The control circuit power switch 17 is turned ON in response to each frame pulse from the frequency dividing circuit 12, and is turned OFF in response to a control signal generated by the microprocessor 15a as later described in more detail. Note that the microprocessor 15a controls the frequency dividing circuit 12, the frame counter 16, the timing generating circuit 13, and so forth, and stops to supply the power to the microprocessor 15a itself by turning OFF the control circuit power switch 17 in response to a frame value outputted from the frame counter 16. In more detail, the microprocessor 15a judges, based on the frame value outputted from the frame counter 16, whether the wireless telephone set under consideration is in a waiting state for waiting a frame signal allocated to the wireless telephone set under consideration, in a receiving state in which a frame signal allocated to another telephone set other than the wireless telephone set under consideration is being received, or in a communicating state in which a frame signal allocated to the wireless telephone set under consideration is being received and a communication is being carried out. The microprocessor 15a turns OFF the control circuit power switch 17 after the judgement of the waiting state, after the receiving state, or after the communicating state.

Namely, the control circuit power switch 17 is ON only during a period necessary to determine whether or not the receiving signal is a frame signal allocated to the wireless telephone set under consideration; the control circuit power switch 17 is ON only during a period necessary to analyze the calling signal, when a calling signal directed to another telephone set is received or the control circuit power switch 17 is ON only during a period necessary to communicate when an arriving call directed to the wireless telephone set under consideration is received.

Figure 2:
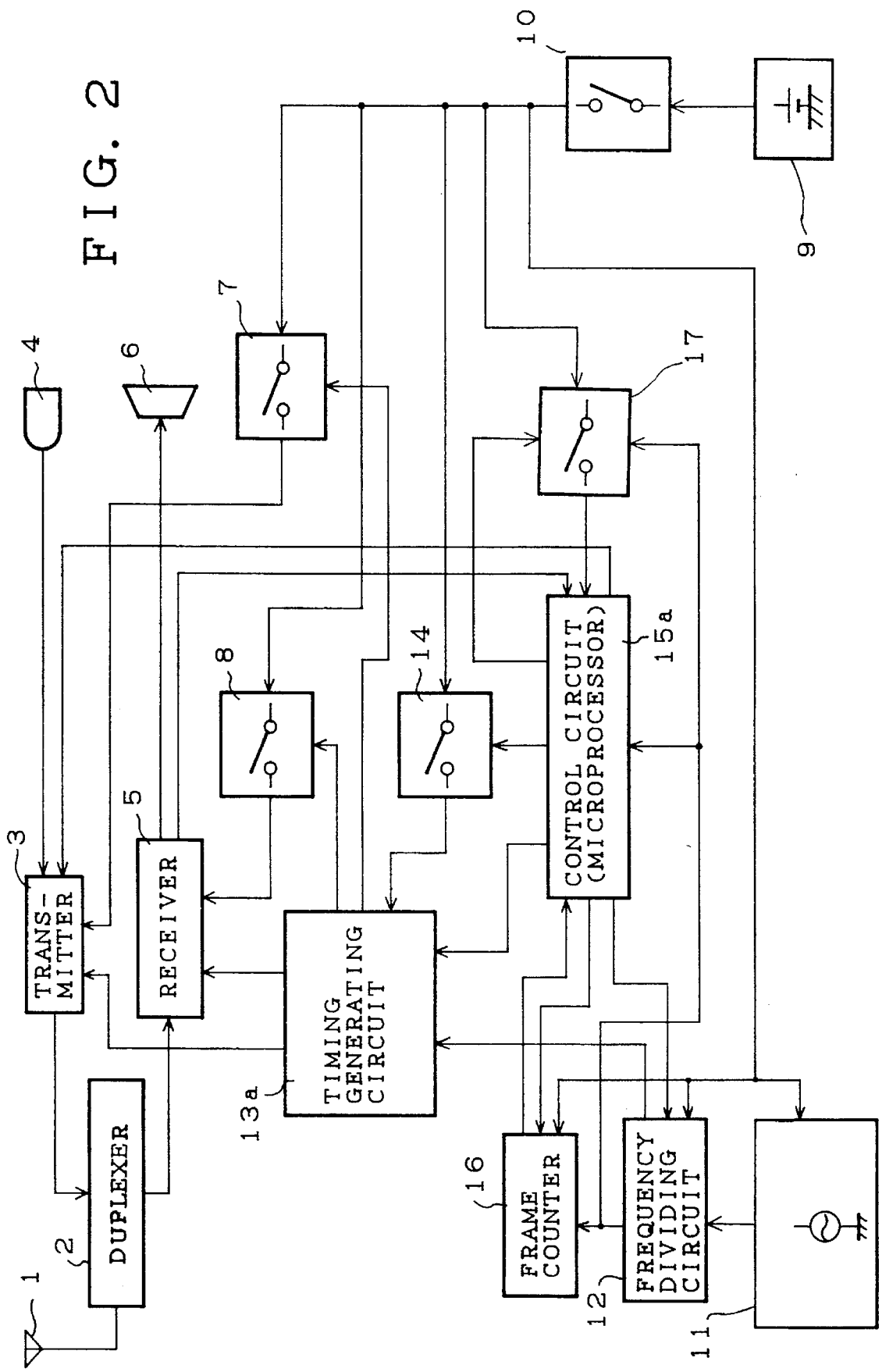
FIG. 2 is a block diagram showing a wireless telephone set according to an embodiment 1 of the present invention.
Figure 3:
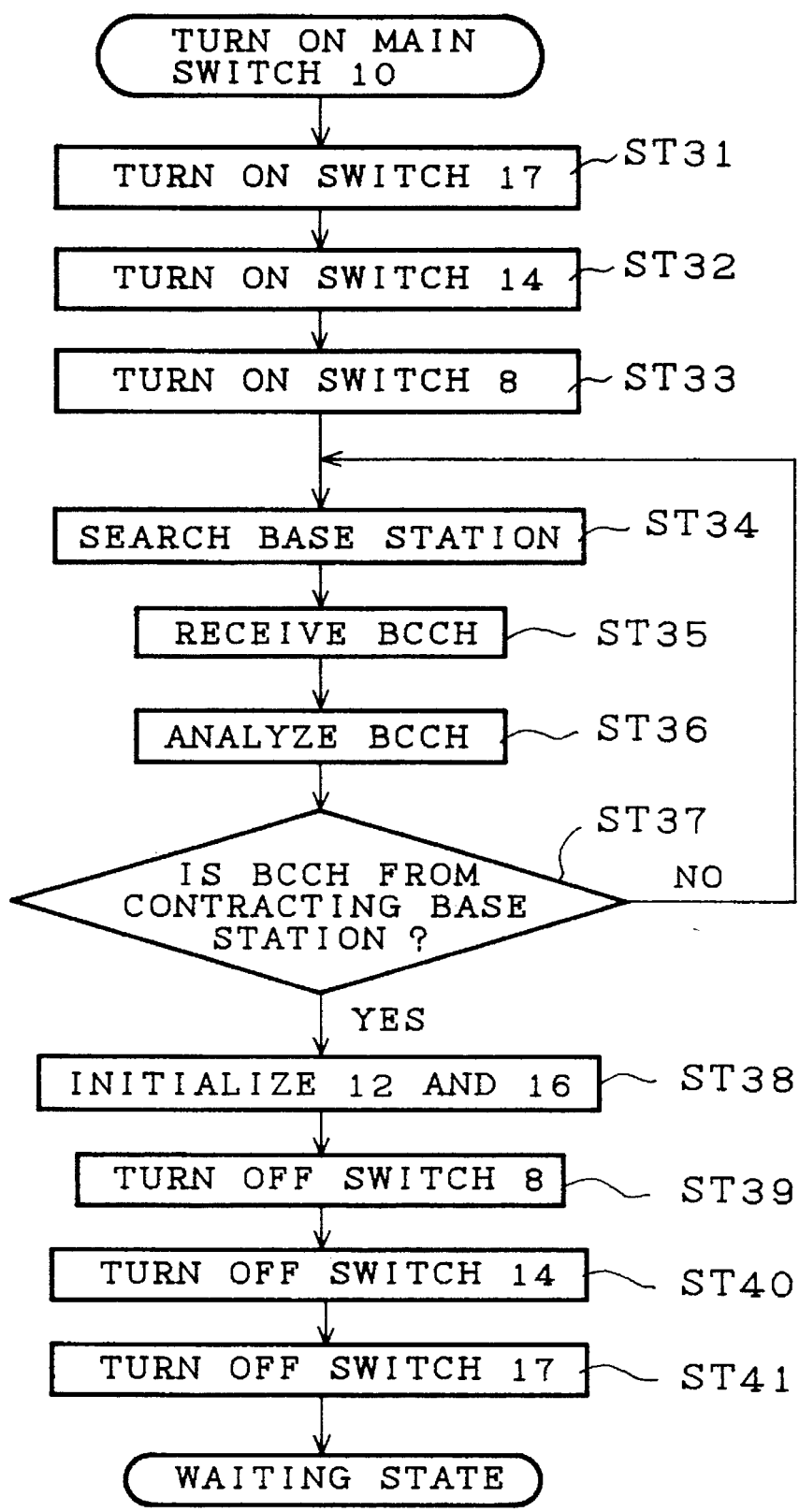
FIG. 3 is a flow chart explaining a part of the operation of the wireless telephone set shown in FIG. 2.

Next, the operation from the turning ON of the main switch 10 to the waiting state in the wireless telephone set shown in FIG. 2 will be described with reference to a flow chart shown in FIG. 3, and time charts shown in FIGS. 4A to 4H.

When the main switch 10 is turned ON (FIG. 4A), the reference signal generator 11, which has received the power from the battery 9 through the main switch 10, starts to oscillate, so that the frequency dividing circuit 12 divides the reference signal generated by the reference signal oscillator 11 to generate frame pulses having a predetermined period (FIG. 4B). The frequency dividing circuit 12 at first runs freely without any relationship with the frame signals in the receiving signal. The control circuit power switch 17 is turned ON in response to the first frame pulse (step ST31, FIG. 4E), so that the microprocessor 15a is supplied with the power to start its operation so as to turn ON the power switch 14 for the timing generating circuit 13a, and to turn ON the receiving-side power switch 8 through the timing generating circuit 13 (steps ST32 and 33, FIG. 4F and 4G). Then the microprocessor 15a searches base stations which are radiating radio waves, receives a Broadcast Control Channel (BCCH) which is a control signal sent from one of the base stations, and analyzes the BCCH to determine whether or not the received BCCH is sent from a contracting base station contracted with the wireless telephone set under consideration (steps ST34, 35, 36, and 37, FIG. 4H). Each BCCH includes a code for identifying the base station from which the BCCH is radiated, the frame number of the frame to which the BCCH belongs, and control information indicating to which frame each Paging Channel (Pch) directing to each wireless telephone set belongs.

At step ST37, when the BCCH is not the control signal sent from the contracting base station, the process returns to the step ST34 to search base stations again. At step ST37, when it is judged that the BCCH is sent from a contracting base station, the wireless telephone set under consideration enters into a waiting state for waiting an arriving call to the wireless telephone set under consideration. To effect the waiting, the microprocessor 15a initialize the frequency dividing circuit 12 and the frame counter 16 (steps ST38, FIG. 4C, FIG. 4D), and turns OFF the receiving-side power switch 8 through the timing generating circuit 13a (step ST39, FIG. 4G). In the example shown in FIG. 4B, the frame signal is raised in response to the end of the BCCH, and, as shown in FIG. 4C, the value of the frame counter 16 is set to "i". This means that the BCCH is allocated with a frame value (i-1).

FIG. 5A shows an example of the contents of the physical slot including the BCCH in the "secondary generation digital cordless telephone (PHP, Personal Handy Phone)", FIG. 5B shows an example of the frame pulse after being reset by the slot, and FIG. 5C shows the frame value after being reset by the BCCH. The BCCH shown in FIG. 5A consists of a rump time R for a transient response, a start symbol SS, a preamble PR, a synchronizing word UW, a Channel Identification CI, an identification code for a calling party, the contents I of the BCCH, a cyclic redundancy check CRC, and a guard. In the example shown in FIG. 5B, at 4375 μs after the end of the BCCH, the frame pulse is reset to be raised. Also, in the example shown in FIG. 5C, the frame value starts from "1" because the BCCH of the PHP is allocated with the frame value "0".

After the frame value is reset and after the channel type corresponding to the frame value is determined (FIG. 4C), the microprocessor 15a turns OFF the receiving-side power switch 8 through the timing generating circuit 13a (step ST39, FIG. 4G). Then, the microprocessor 15a directly turns OFF the power switch 14 for the timing generating circuit 13a and the control circuit power switch 17 for the microprocessor 15a (steps ST40 and 41, FIGS. 4E and 4F). After this, the wireless telephone set under consideration enters into the waiting state for waiting an arriving call, so that the power switch 17 for the microprocessor 15a is turned ON only during a predetermined short period at each time the microprocessor 15a receives the pulse of the frame signal from the frequency dividing circuit 12. This predetermined short period is the time necessary and sufficient For judging, based on the frame value, whether or not the channel type of the receiving signal is the channel type allocated to the wireless telephone set under consideration. On the other hand, the frequency dividing circuit 12 continues to generate the frame pulses by dividing the reference signal from the reference signal oscillator 11, and the frame counter 16 continues to count the frame pulses. By this, those which are supplied with the power during the waiting state after receiving the control signal BCCH from the contracting base station are only three, i.e., the reference oscillator 11, the frequency dividing circuit 12, and the frame counter 16, so that the power consumption is greatly decreased in comparison with the conventional case in which the power is always supplied to the microprocessor 15.

Figure 6:
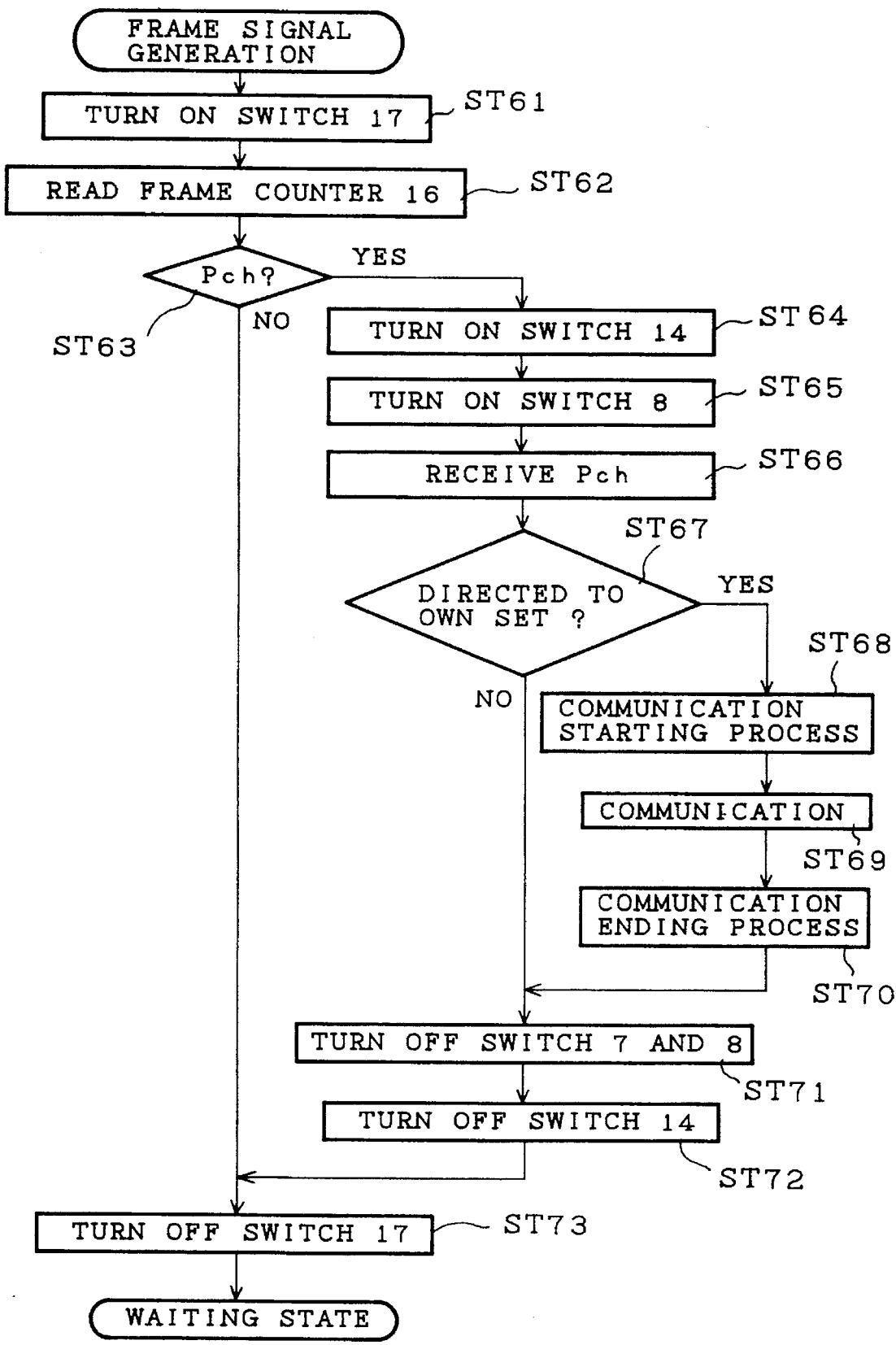
FIG. 6 is a flow chart explaining another part of the operation of the wireless telephone set shown in FIG. 2.

Next, an arriving call process in the above-mentioned waiting state will be described with reference to the flow chart shown in FIG. 6, the time charts shown in FIG. 7A to 7H, the time charts 8A to 8I, the time charts 9A to 9C, and the time charts 10A to 10I.

First, the operation before detecting an arriving call in the above-mentioned waiting state will be described with reference to the flow chart shown in FIG. 6 and the time charts shown in FIGS. 7A to 7H.

The power switch 17 for the microprocessor 15a is turned ON for the above-mentioned short period in response to each frame pulse from the frequency dividing circuit 12 so that the microprocessor 15a starts to operate (step ST61). The microprocessor 15a which has started the operation at first reads the frame value from the frame counter 16 (step ST62), and judges, based on the frame value, whether or not the channel of the frame is a Paging Channel (Pch) allocated to any one of the telephone sets (step ST63).

At step ST63, if the value of the frame counter 16 does not indicate the Pch, the microprocessor 15a turns OFF the power switch 17 for the microprocessor 15a, so that the wireless telephone set under consideration becomes the waiting state again (step ST63, ST73).

At step ST63, if the value of the frame counter 16 indicates the Pch, the microprocessor 15a turns ON the power switch 14 (step ST64), turns ON the receiving-side power switch 8 (step ST65) through the timing generating circuit 13a, and receives the signal of the Pch. Then, the microprocessor 15a judges whether or not the received Pch signal is allocated to the wireless telephone set under consideration (step ST67).

In the judgement at step ST 67, if it is judged that the destination of the arriving call (Pch signal) is not the wireless telephone set under consideration but is another telephone set (FIG. 7H), the process proceeds to the step ST71 so that the microprocessor 15a turns OFF the receiving-side power switch 8 (step ST71, FIG. 7F), and then turns OFF the power switch 14 for the timing generating circuit 13a (step ST73, FIG 7E), and finally turns OFF the switch 17 for the microprocessor 15a (step ST73, FIG. 7D). Thus, the microprocessor 15a is returned to the waiting state again.

Next, the operation to detect an arriving call to the wireless telephone set under consideration in the abovementioned waiting state will be described with reference to the steps ST 68 to 70 in FIG. 6 and FIGS. 8A to 8I.

In the judgement at step ST67, when the destination of the arriving call is the wireless telephone set under consideration, the microprocessor 15a carries out a communication starting process (step ST68, FIG. 8I). Then, a communication is carried out by alternately turning ON the receiving-side power switch 8 and the transmitting-side power switch 7 (step ST69, FIGS. 8F and 8G). When the communication is finished,-a communication ending process is carried out (step ST70, FIG. 8I). When the communication ending process is finished, the microprocessor 15*a* turns OFF the receiving-side power switch 8 and the transmitting-side power switch 7 through the timing generating circuit 13 (step ST71), directly turns OFF the power switch 14 for the timing generating circuit 13*a* (step ST72), and directly turns OFF the power switch 17 for the microprocessor 15*a* (step ST73). Thus, the wireless telephone set under consideration returns to the waiting state.

As will be apparent from the above-described operation, according to this embodiment 1 of the present invention, when the wireless telephone set under consideration is in a waiting state in which the Pch is not received, the power switch 17 for the microprocessor 15*a* is turned ON during a short period necessary to judge whether or not the receiving channel type is the Pch; and when the Pch is received, the power switch 17 is turned ON during a period necessary to judge whether or not the Pch is directed to the wireless telephone set under consideration (own station). When the received Pch is judged to be directed to the wireless telephone set under consideration (own station), the power switch 17 is turned ON during a period from the reception of the Pch to the end of the communication ending process. Thus, the power conducting time for the microprocessor 15*a* is greatly shortened.

Similarly, when the wireless telephone set under consideration is in a waiting state in which the Pch is not received, the power switch 14 for the timing generating circuit 13*a* is turned ON during a short period necessary to judge whether or not the receiving channel type is the Pch; and when the Pch is received, the power switch 14 is turned ON during a period necessary to judge whether or not the Pch is directed to the wireless telephone set under consideration. When the received Pch is judged to be directed to the wireless telephone set under consideration, the power switch 14 is turned ON during a period from the reception of the Pch to the end of the communication ending process. Thus, the power conducting period for the timing generating circuit 13*a* is also greatly shortened.

Figure 9A:
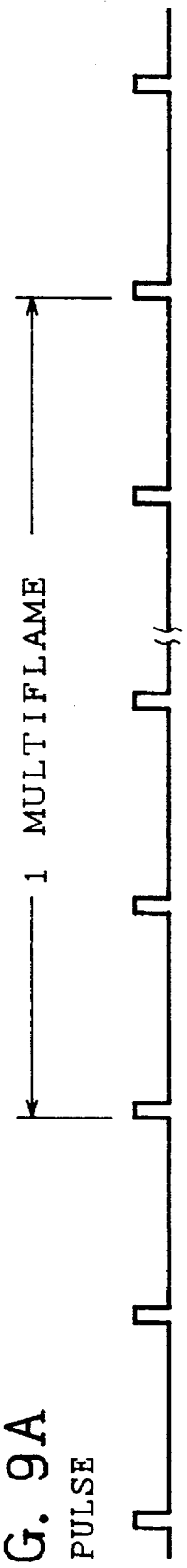
FIG. 9A to FIG. 9C are time charts explaining the change of the frame values and the channel types in the wireless telephone set shown in FIG. 2.
Figure 9B:
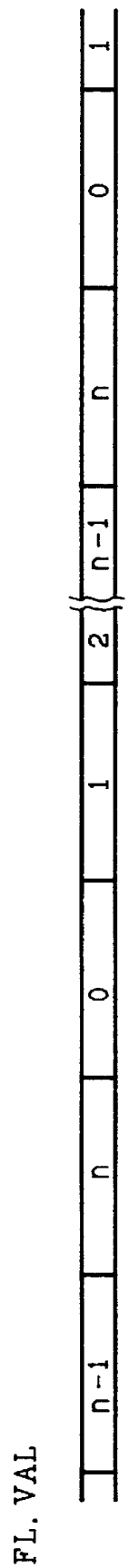
Figure 9C:
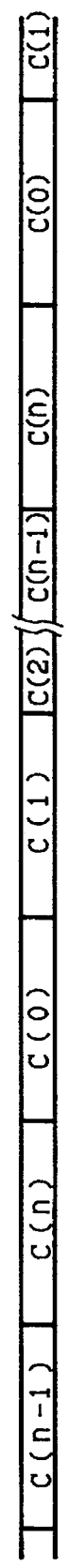

FIG. 9A to FIG. 9C show the relationship among the frame pulses outputted from the frequency dividing circuit 12 after receiving the BCCH, the frame values outputted from the frame counter 16, and the channel types corresponding to the respective frame values, in the above-described embodiment. As shown in FIGS. 9A to 9C, one multiframe consists of a predetermined number of frame pulses corresponding to the frame values 0 to n. Each of the frame pulses corresponds to one frame signal in the receiving or transmitting signal.

In the above embodiment, the power switch 17 for the microprocessor 15*a* and the power switch 14 for the timing generating circuit 13 are always ON during the communication starting process as shown in FIG. 8D and 8E, however, it may be possible according to a modification of the above embodiment of the present invention to stop to supply the power to the microprocessor 15*a* and the timing generating circuit 13 after judging that the Pch is directed to the wireless telephone set under consideration and before the actual start of the control of the communication starting process. This modification is shown in FIG. 10A to FIG. 10I. In FIG. 8A to FIG. 8I and FIG. 10A to FIG. 10I, only FIG. 10D and FIG. 10E are different from FIG. 8D and FIG. 8E. As shown in FIG. 10D and FIG. 10E, the control circuit power switch 17 and the timing generating circuit power switch 14 are OFF during times T1 and T2, namely, during a period after the judgement that the Pch is directed to the wireless telephone set under consideration and before the actual start of the control of the communication starting process.

Embodiment 2.

Figure 11:
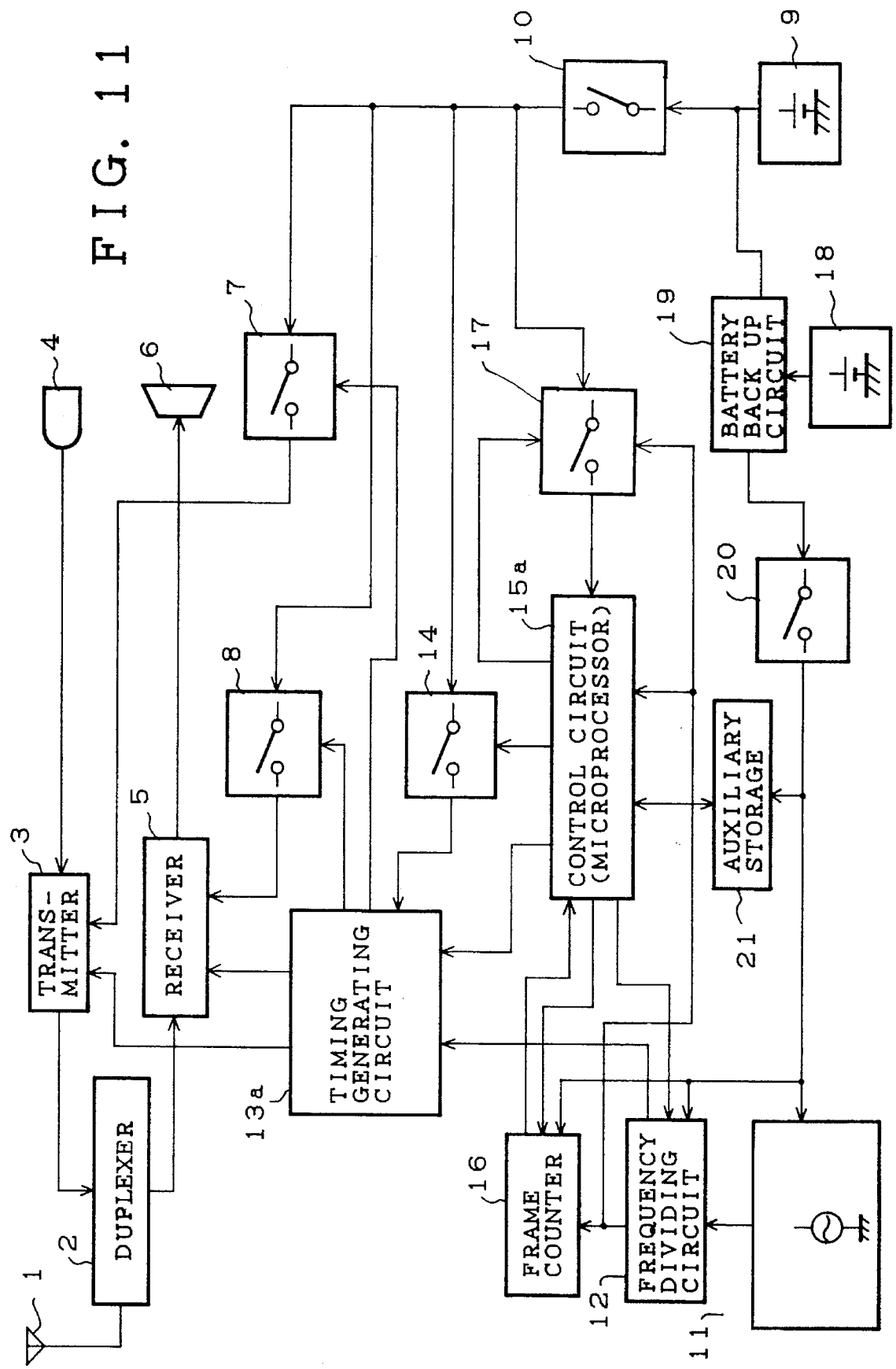
FIG. 11 is a block diagram showing a wireless telephone set according to an embodiment 2 of the present invention.

Next, an embodiment 2 of the present invention will be described with reference to FIG. 11. In FIG. 11, the corresponding parts are denoted with the same symbols in FIG. 2 and their explanations are omitted. In the figure, reference numeral 18 is an auxiliary battery for backing up the battery 9, and 19 is a battery back up circuit for switching to the auxiliary battery 18 when the voltage of the battery 9 is lowered or when the battery 9 is removed. Reference numeral 20 is a back up power switch, which interlocks with the main switch 10 to operate, for supplying the power from the battery 9 or the auxiliary battery 18, which is switched by the battery back up circuit 19, to the reference signal oscillator 11, the frequency dividing circuit 12, and the frame counter 16. Reference numeral 21 is an auxiliary storage for receiving the power supply through the back up power switch 20 to store and hold the operating state of the wireless telephone set under consideration.

Next, the operation will be described. Here, since the basic operation is the same as that in the embodiment 1, its explanation is omitted. When the main switch 10 is turned ON, the backup power switch 20 is also turned ON so that the reference frequency oscillator 11, the frequency dividing circuit 12, and the frame counter 16 are supplied with a power from the battery 9. The microprocessor 15*a* sends the operating state of the wireless telephone set under consideration each time it receives a frame signal to the auxiliary storage 21 to store and hold it therein. When the voltage of the battery 9 is lowered due to exhaustion during a communication, the battery back up circuit 19 switches from the power supplied from the battery 9 to the one from the auxiliary battery 18. Whereby, the reference signal oscillator 11, the frequency dividing circuit 12, and the frame counter 16 continue to operate normally, and the auxiliary storage 21 continues to hold the operating state of the wireless telephone set under consideration at that time. Accordingly, even when the battery 9 is removed to be exchanged, the call is not cut although the communication is cut, and once a new battery 9 is again mounted, the communication can be started again.

According to a modification of the above embodiment 2, the battery backup power switch 20 may be removed. In this case, the output of the battery backup circuit 19 is directly connected to the reference frequency oscillator 11, the frequency dividing circuit 12, the frame counter 16, and the auxiliary storage 21 so that these elements are supplied with the power even when the main switch 10 is in an OFF state.

Further, according to another modification of the embodiment 2, instead of providing the auxiliary storage 21, the microprocessor 15*a* may store the operating state of the wireless telephone set under consideration each time it receives a frame signal. By this, the auxiliary storage 21 is not necessary.

Embodiment 3.

Figure 12:
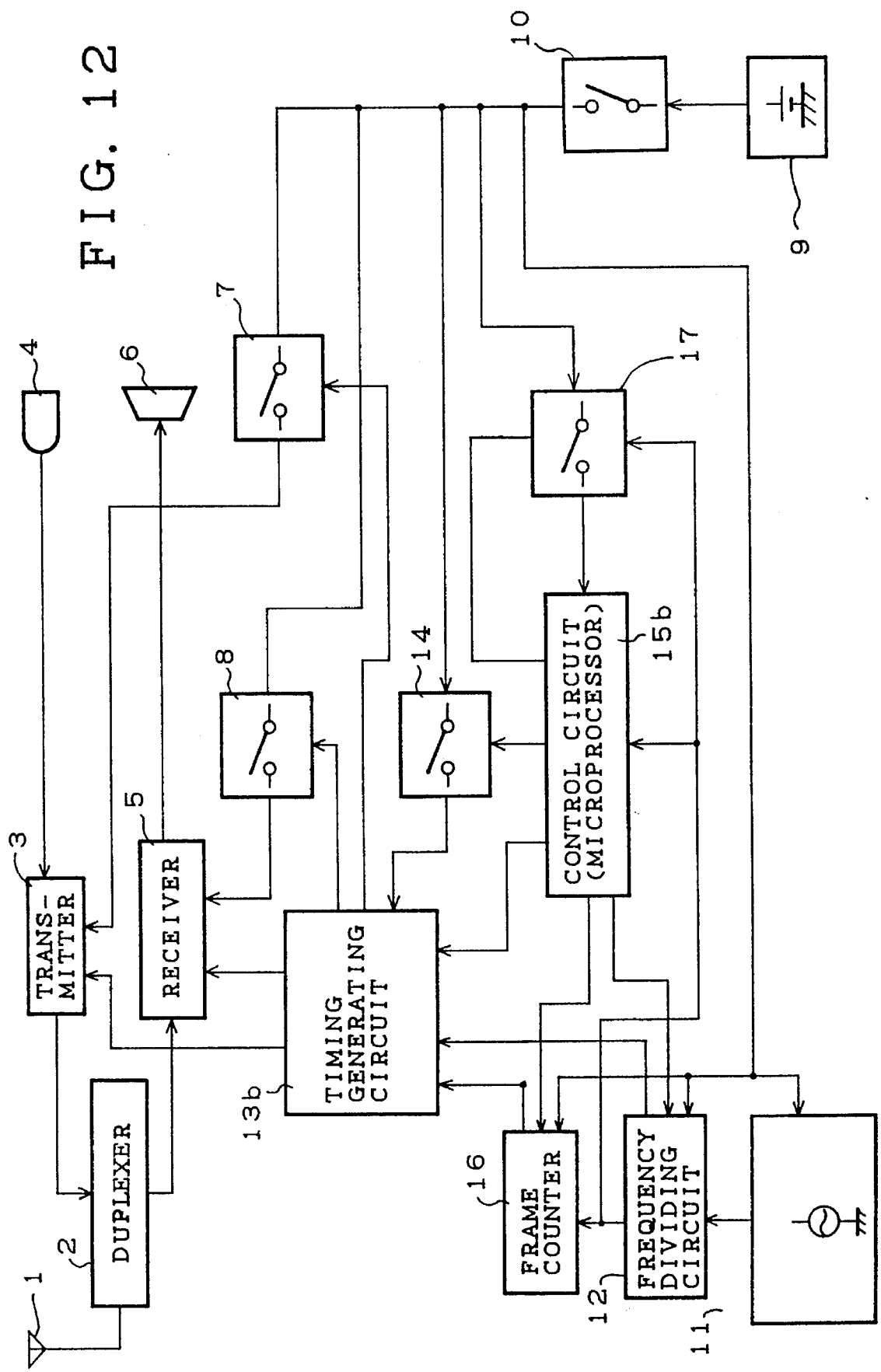
FIG. 12 is a block diagram showing a wireless telephone set according to an embodiment 3 of the present invention.

In the above-described embodiments, an explanation was given for the case in which the control of the timing of the transmission and the reception by the timing generating circuit 13*a* is carried out based on the frame pulses outputted from the frequency dividing circuit 12, it can also be carried out based on both of the frame pulses read from the frequency dividing circuit 12 and the frame values read from the frame counter 16. FIG. 12 is a block diagram showing this embodiment 3 of the present invention, in which each part is denoted by the same or similar symbol for the corresponding part in FIG. 2, and the explanation thereof is omitted. The embodiment shown in FIG. 12 is different from the one shown in FIG. 2 in that the frame value from the frame counter 16 is inputted into a timing generating circuit 13b and a microprocessor 15b does not receive the frame value from the frame counter 16.

Thus, by inputting the frame value counted by the frame counter 16, the timing generating circuit 13b determines by itself the frame, so that the transmitter 3, the receiver 5, the transmitting-side power switch 7, and the receiving-side power switch 8 can be controlled with a reduction of the intervention of the microprocessor 15b. Therefore, the processing load of the microprocessor 15b can be largely reduced.

Embodiment 4.

Figure 13:
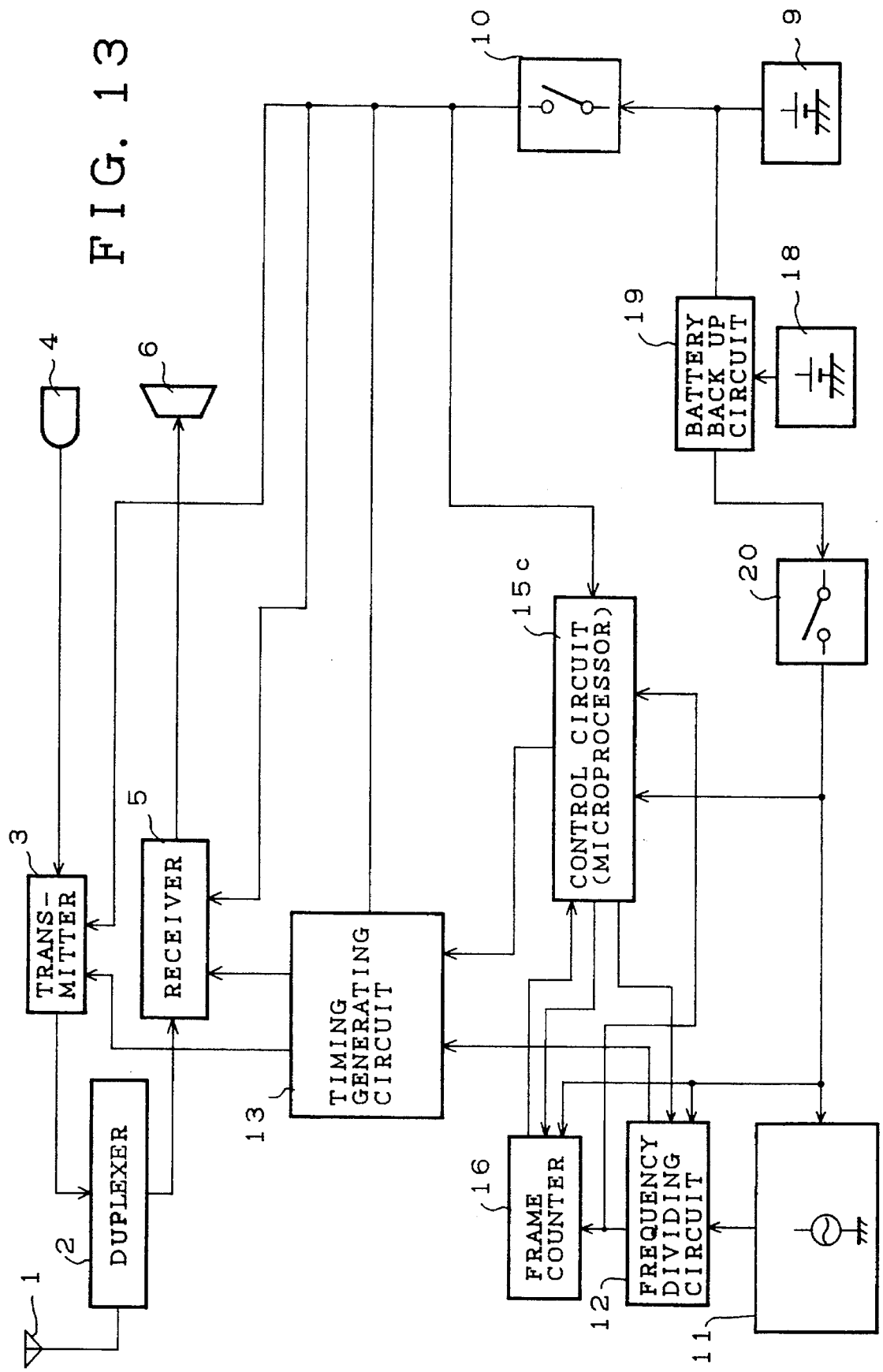
FIG. 13 is a block diagram showing a wireless telephone set according to an embodiment 4 of the present invention.

In the above embodiment 2, the battery back up system is included in the wireless telephone set of the first embodiment 1, however, according to an embodiment 4, the battery back up system may also be applied to the conventional wireless telephone set shown in FIG. 1. FIG. 13 is a block diagram showing the wireless telephone set according to the embodiment 4. In FIG. 13, a microprocessor 15c always stores the operating state of the wireless telephone set under consideration each time it receives a frame signal. The auxiliary battery 18 and the battery backup circuit 19 are provided in the conventional wireless telephone set shown in FIG. 1. The output of the battery backup circuit 19 is connected through the backup power switch 20 to the reference frequency oscillator 11, to the frequency dividing circuit 12, to the frame counter 16, and to the microprocessor 15C.

Next, the operation will be described. Here, since the basic operation is the same as that in the conventional wireless telephone set, its explanation is omitted. When the voltage of the battery 9 is lowered due to exhaustion during a communication, the battery back up circuit 19 switches from the power supplied from the battery 9 to the one from the auxiliary battery 18. Whereby, the reference signal oscillator 11, the frequency dividing circuit 12, the frame counter 16, and the microprocessor 15c continue to operate normally. Accordingly, even when the voltage of the battery 9 is lowered, the call is not disconnected because the microprocessor 15c stores the operating state when the communication is interrupted, and once a new battery 9 is again mounted, the communication can be started again.

Similar to the embodiment 2, in the above embodiment 4, the battery backup power switch 20 may be removed according to a modification of the embodiment 4. In this case, the output of the battery backup circuit 19 is directly connected to the reference frequency oscillator 11, the frequency dividing circuit 12, the frame counter 16, and the auxiliary storage 21 (which is shown in embodiment 2 and, for the modification of embodiment 4 being referred to, would become an element of embodiment 4 and be connected in FIG. 13 in the same manner as shown in FIG. 11 for embodiment 2) so that these elements are supplied with the power even when the main switch 10 is in an OFF state.

Embodiment 5

Figure 14:
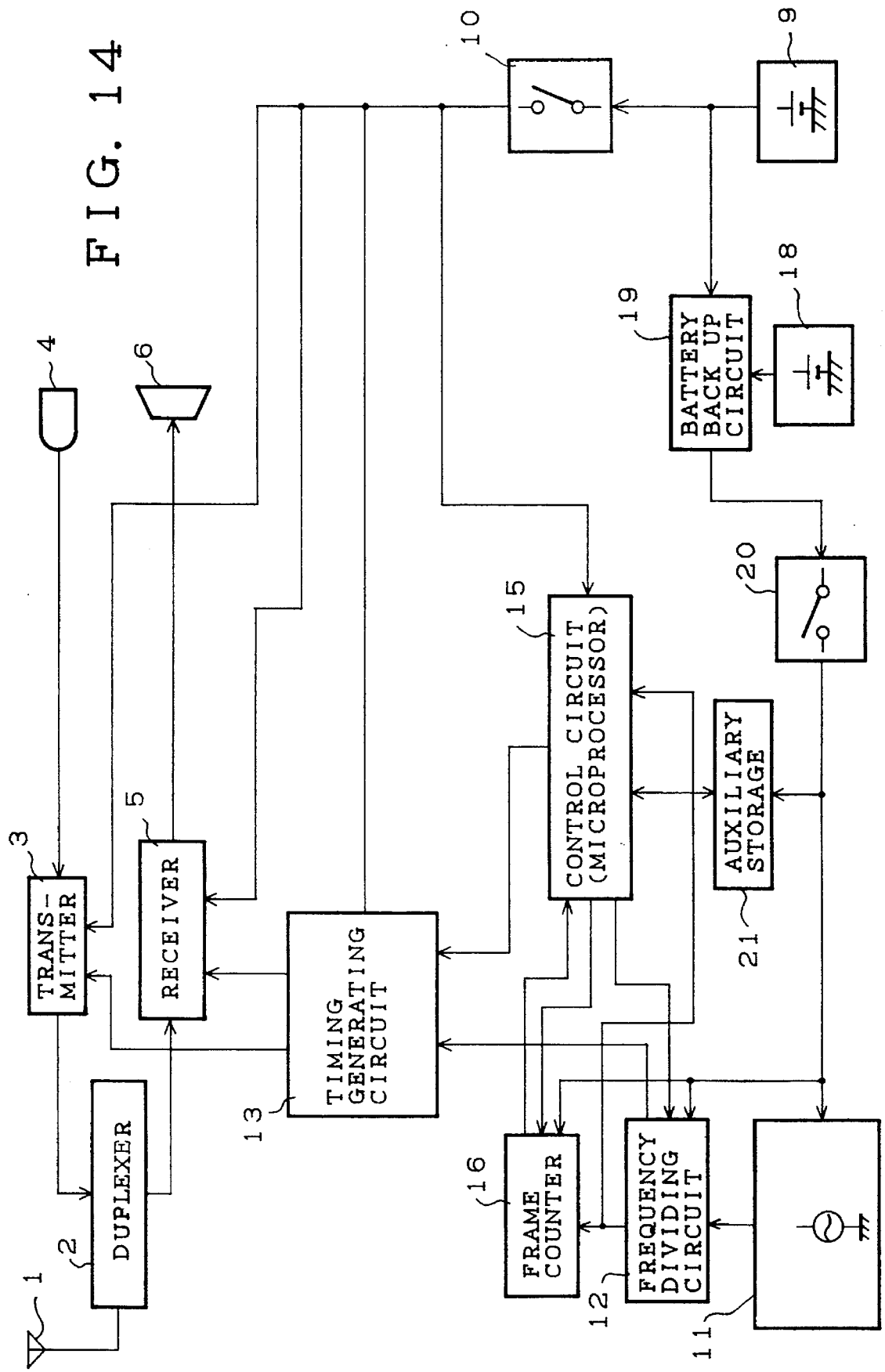
FIG. 14 is a block diagram showing a wireless telephone set according to an embodiment 5 of the present invention.

In the above embodiment 4, the microprocessor 15c stores the operating state of the wireless telephone set under consideration, however, similar to the embodiment 2 shown in FIG. 11, the auxiliary storage 21 may be provided to store the operating state of the wireless telephone set under consideration, as shown in FIG. 14. In FIG. 14, the auxiliary battery 18, the battery backup circuit 19, and the auxiliary storage 21 are provided in the conventional wireless telephone set shown in FIG. 1. The output of the battery backup circuit 19 is connected through the backup power switch 20 to the reference frequency oscillator 11, to the frequency dividing circuit 12, to the frame counter 16, and to the auxiliary storage 21.

Next, the operation will be described. Here, since the basic operation is the same as that in the conventional wireless telephone set, its explanation is omitted. When the voltage of the battery 9 is lowered due to exhaustion during a communication, the battery back up circuit 19 switches from the power supplied from the battery 9 to the one from the auxiliary battery 18. Whereby, the reference signal oscillator 11, the frequency dividing circuit 12, the frame counter 16, and the auxiliary storage 21 continue to operate normally. Accordingly, even when the voltage of the battery 9 is lowered, the call is not disconnected, and once a new battery 9 is again mounted, the communication can be started again.

Similar to the embodiment 4, in the above embodiment 5, the battery backup power switch 20 may be removed according to a modification of the embodiment 5.

The present invention is not restricted to the above-described embodiments, but various changes and modifications are possible without departing from the spirit of the present invention.

As described above, in the wireless telephone set according to the first aspect of the present invention, since the control means turns OFF the power switch for the control means after any one of the following three states, namely, after the control means judges that the wireless telephone set is in a waiting state for waiting a frame signal allocated to the wireless telephone set, after the control means judges that in a first receiving state in which a frame signal allocated to another telephone set is being received, and after the control means judges that a communication ending process is finished in a second receiving state in which a frame signal allocated to the wireless telephone set under consideration is received, the power to the control means in the waiting state for waiting an arriving call is greatly reduced.

Also, according to the second aspect of the present invention, since the operating state of the wireless telephone set under consideration is stored and held in an auxiliary storage for receiving the power through a battery back up circuit and a back up power switch, there is an effect in that even when the battery is exchanged during communication, the call is not disconnected, and once a battery is again mounted, the communication can be started again.

Further, according to the third aspect of the present invention, since the timing generating circuit carries out the timing control based on the frame pulse from the frequency dividing circuit and the frame value from the frame counter, the processing load of the control circuit can be largely reduced.

What is claimed is:

1. A wireless telephone set for transmitting and receiving signal to and from another telephone set, said signal including, in each multiframe predetermined number of frame signals allocated to respective telephone sets, comprising:

control means for controlling the transmission and the reception of the signal a power switch for controlling the supply of power to said control means, said power switch being turned ON to supply the power to said control means in response to each of said frame signals;

said control means including:

status judging means for judging, based on the receiving frame signal, whether or not said wireless telephone set is in a waiting state for waiting a frame signal allocated to said wireless telephone set; and switching means for turning OFF said power switch to stop the supply of power to said control means when said status judging means judges that said wireless telephone set is in said waiting state;

wherein said status judging means further judges whether said wireless telephone set is in a first receiving state in which a frame signal allocated to another telephone set is being received, or in a second receiving state in which a frame signal allocated to said wireless telephone set is received so that a communication is being effected; and said switching means turns OFF said power switch after said status judging means judges that said wireless telephone set is in said first receiving state, or a communication ending process is finished in said second receiving state;

said wireless telephone set further comprising:

a frequency dividing circuit for generating frame pulses synchronized with said frame signals in the receiving signal;

a frame counter for counting said frame pulses to output count values of said frame pulses, the count values being coincident with frame values of said frame signals included in said receiving signal, said frame counter being connected to output said frame receiving signals to said status judging means for enabling said status judging means to judge whether or not said wireless telephone set is in a waiting state; and a timing generating circuit for controlling transmitting and receiving timings, based on the frame pulses outputted from said frequency dividing circuit.

2. A wireless telephone set as claimed in claim 1, wherein said status judging means judges the status of the wireless telephone set under consideration based on the count values outputted from said frame counter.

3. A wireless telephone set as claimed in claim 1, wherein said control means further comprises a timing generating circuit power switch, said switching means turning OFF said timing generating circuit power switch to stop the supply of the power to said timing generating circuit after said status judging means judges that said wireless telephone set is in said waiting state, in said first receiving state, or in said second receiving state.

4. A wireless telephone set as claimed in claim 3, wherein said timing generating circuit controls said transmitting and receiving timings based on the frame pulse outputted from said frequency dividing circuit and the frame value read from said frame counter.

5. A wireless telephone set as claimed in claim 1, wherein said control means keeps said power switch to be an OFF state during a period after said control means judges that the receiving frame signal is allocated to the wireless telephone set and before the control means starts to control a communication start process.

6. A wireless telephone set as claimed in claim 1 further comprising:

a reference signal oscillator for generating a reference signal, said frequency dividing circuit dividing said reference signal to output said frame pulses;

a battery for supplying a power to said reference signal generator, to said frequency dividing circuit, and to said frame counter in a normal state;

an auxiliary battery for backing up said battery; and a battery back up circuit for switching from said battery to said auxiliary battery when the voltage of said battery is lowered or when said battery is removed from said wireless telephone set;

wherein said reference frequency oscillator, said frequency dividing circuit, and said frame counter are supplied with the power through said battery backup circuit.

7. A wireless telephone set as claimed in claim 6, wherein said control means stores and holds the operating state of the wireless telephone and is backed up by said battery backup circuit.

8. A wireless telephone set as claimed in claim 6 further comprising an auxiliary storage for storing and holding the operating state of the wireless telephone set under consideration, and said auxiliary storage being backed up by said battery backup circuit.

9. A wireless telephone set for transmitting and receiving a signal to and from another telephone set, comprising:

a reference signal oscillator for generating a reference signal;

a frequency dividing circuit for dividing said reference signal to generate frame pulses synchronized with frame signals in the receiving signal;

a frame counter for counting said frame pulses to output count values of said frame pulses, the count values being coincident with frame values of said frame signals included in said receiving signal, said frame counter being connected to output said frame receiving signals to a status judging means for enabling the status judging means to judge whether or not said wireless telephone set is in a waiting state;

a battery for supplying power to said reference signal generator, to said frequency dividing circuit, and to said frame counter in a normal state; and an auxiliary battery for backing up said battery;

a battery back up circuit for switching from said battery to said auxiliary battery when the voltage of said battery is lowered or when said battery is removed from the wireless telephone set under consideration;

wherein said reference frequency oscillator, said frequency dividing circuit, and said frame counter are supplied with power through said battery backup circuit.

10. A wireless telephone set as claimed in claim 9, wherein said control means stores and holds the operating state of the wireless telephone set under consideration and is backed up by said battery backup circuit.

11. A wireless telephone set as claimed in claim 9 further comprising an auxiliary storage for receiving the power from said battery backup circuit to store and hold the operating state of the wireless telephone set under consideration, and said auxiliary storage being backed up by said battery backup circuit.

* * * * *

UNITED STATES PATENT AND TRADEMARK OFFICE
CERTIFICATE OF CORRECTION

PATENT NO. : 5,519,757
DATED : May 21, 1996
INVENTOR(S) : Shigetsune Torin

It is certified that error appears in the above-indentified patent and that said Letters Patent is hereby corrected as shown below:

Col. 10, line 67 (claim 1), after "signal" insert -- ; and --.

Signed and Sealed this

Twenty-ninth Day of October 1996

Attest:

BRUCE LEHMAN

*Attesting Officer*  *Commissioner of Patents and Trademarks*